US009827524B2

(12) United States Patent
Lukasavitz

(10) Patent No.: US 9,827,524 B2
(45) Date of Patent: Nov. 28, 2017

(54) AIR FILTRATION CARTRIDGES HAVING AIR FLOW RECTIFICATION AND METHODS OF MAKING AIR FILTRATION CARTRIDGES HAVING AIR FLOW RECTIFICATION

(71) Applicant: Cummins Filtration IP, Inc., Columbus, IN (US)

(72) Inventor: John C. Lukasavitz, Flushing, MI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 95 days.

(21) Appl. No.: 14/783,982

(22) PCT Filed: Apr. 17, 2014

(86) PCT No.: PCT/US2014/034448
§ 371 (c)(1),
(2) Date: Oct. 12, 2015

(87) PCT Pub. No.: WO2014/172518
PCT Pub. Date: Oct. 23, 2014

(65) Prior Publication Data
US 2016/0059171 A1    Mar. 3, 2016

Related U.S. Application Data

(60) Provisional application No. 61/812,925, filed on Apr. 17, 2013.

(51) Int. Cl.
*B01D 46/00* (2006.01)
*F02M 35/024* (2006.01)
(Continued)

(52) U.S. Cl.
CPC ..... *B01D 46/0049* (2013.01); *F02M 35/0202* (2013.01); *F02M 35/024* (2013.01);
(Continued)

(58) Field of Classification Search
CPC .......... B01D 45/12; B01D 46/00; B04C 3/06; G01F 1/10; G01F 1/37; F15D 1/02
(Continued)

(56) References Cited

U.S. PATENT DOCUMENTS 5,596,152 A * 1/1997 Bergervoet ........... F15D 1/0005
138/44
6,199,434 B1  3/2001 Cornil et al.
(Continued)

FOREIGN PATENT DOCUMENTS

EP    1 843 035    10/2007

OTHER PUBLICATIONS

International Search Report and Written Opinion for PCT/US2014/034448, issued Aug. 29, 2014, 8 pages.

*Primary Examiner* — Duane Smith
*Assistant Examiner* — Minh-Chau Pham
(74) *Attorney, Agent, or Firm* — Foley & Lardner LLP

(57) ABSTRACT

An air cleaner includes a housing having an air inlet and an air outlet. The air cleaner further includes a filter media coupled to the housing and positioned between the air inlet and the air outlet, the filter media configured to filter an air flow that enters the housing through the air inlet and exits the housing through the air outlet. The air cleaner includes a rectifier coupled to the housing and positioned at a location downstream of the filter media, the rectifier including an outer ring that is orthogonally oriented with respect to the air flow.

21 Claims, 8 Drawing Sheets

(51) Int. Cl.
  *G01F 1/684* (2006.01)
  *G01F 15/00* (2006.01)
  *G01F 15/14* (2006.01)
  *F02M 35/02* (2006.01)
  *F15D 1/04* (2006.01)
  *G01F 1/76* (2006.01)

(52) U.S. Cl.
  CPC ........... *F02M 35/0205* (2013.01); *F15D 1/04* (2013.01); *G01F 1/6842* (2013.01); *G01F 1/76* (2013.01); *G01F 15/00* (2013.01); *G01F 15/14* (2013.01)

(58) Field of Classification Search
  USPC .... 55/347, 348, 413, 448, 486; 96/208, 268; 210/512.1, 188
  See application file for complete search history.

(56) References Cited

U.S. PATENT DOCUMENTS

| | | | |
|---|---|---|---|
| 6,267,006 | B1 | 7/2001 | Bugli et al. |
| 6,620,217 | B2* | 9/2003 | Bruckmann ........... B01D 45/12 210/512.1 |
| 6,655,207 | B1 | 12/2003 | Speldrich et al. |
| 7,377,954 | B2 | 5/2008 | Gunderson et al. |
| 7,497,301 | B2 | 3/2009 | Cheng et al. |
| 7,600,436 | B2 | 10/2009 | Hoecker |
| 7,905,153 | B2 | 3/2011 | Jasnie |
| 2003/0029145 | A1* | 2/2003 | Sudoh ............... B01D 46/0004 55/418 |
| 2003/0041675 | A1* | 3/2003 | Armstrong ................ G01F 5/00 73/861.52 |
| 2005/0087012 | A1 | 4/2005 | Setescak |

* cited by examiner

AIR FILTRATION CARTRIDGES HAVING AIR FLOW RECTIFICATION AND METHODS OF MAKING AIR FILTRATION CARTRIDGES HAVING AIR FLOW RECTIFICATION

CROSS REFERENCE TO RELATED APPLICATIONS

This application is a National Stage of PCT Application No. PCT/US2014/034448, filed Apr. 17, 2014, which claims priority to U.S. Provisional Patent Application No. 61/812,925 entitled "AIR FILTRATION CARTRIDGES HAVING AIR FLOW RECTIFICATION AND METHODS OF MAKING AIR FILTRATION CARTRIDGES HAVING AIR FLOW RECTIFICATION," filed Apr. 17, 2013, The contents of both applications are herein incorporated by reference in their entirety and for all purposes.

FIELD

The present disclosure relates to air filtration systems having a mass air flow (MAF) sensor. The described air filtration systems may include an air flow rectification device that provides a low variation of air flow to the MAF sensor. The rectification device may include openings that reduce the pressure loss across the rectification device. Both the air rectification characteristics and the pressure loss mitigation features of the devices improve the accuracy and output of the MAF sensor to the engine control module.

BACKGROUND

Internal combustion engines generally combust a mixture of fuel (e.g., gasoline, diesel, natural gas, etc.) and air. Prior to entering the engine, the air is typically passed through an air filtration system. A mass air flow (MAF) sensor is placed downstream of the air filter (i.e., on the clean side of the air filter media) and provides feedback to an engine control module (ECM). However, the air flow exiting the filter element may be inconsistent resulting in high variation of the MAF sensor to the ECM. Additionally, the orifice of the air filtration system that feeds the MAF sensor may cause a high pressure loss across the MAF sensor, thereby further reducing the accuracy of the MAF sensor output provided to the ECM.

U.S. Pat. No. 7,905,153, which is incorporated herein by reference in entirety, discloses a flow vortex suppression apparatus for use in an air intake duct having a MAF sensor. The flow vortex suppression apparatus includes an air flow permeable fibrous vortex dispersive media installed into the air duct in a position upstream of the MAF sensor and configured to occlude the air duct such that air flow in the duct is constrained to pass through the vortex dispersive media. The vortex dispersive media is configured and adapted to diffuse vortices and reduce air turbulence of an air stream entering the MAF sensor, thereby reducing variations and noise in a flow measurement signal from the mass air flow sensor.

U.S. Pat. No. 7,600,436, which is incorporated herein by reference in entirety, discloses a measuring system that is inserted into the course of a process line and serves for registering at least one measured variable of a medium flowing in the process line. The measuring system includes for such purpose a measuring transducer having a measuring tube serving for conveying medium being measured and a sensor arrangement, which has at least one sensor element reacting primarily to the measured variable to be registered, and which delivers by means of at least one sensor element at least one measurement signal influenced by the measured variable.

U.S. Pat. No. 7,497,301, which is incorporated herein by reference in entirety, discloses an acoustic silencer provided by a tubular member extending along an axis and having a hollow interior defining an axial flow path therethrough. The tubular member has a sidewall with an interior face facing the hollow interior and having quarter wave resonators formed by blind holes therein.

U.S. Pat. No. 7,377,954, which is incorporated herein by reference in entirety, discloses an air filtration cartridge with annular filter media having a hollow interior and extending axially between first and second distally opposite end caps. The first end cap is an outlet end cap having flow straightening structure integrally formed therewith and spanning the hollow interior. The second end cap is a closed end cap having an interior face having quarter wave resonators formed by blind holes therein.

U.S. Pat. No. 6,655,207, which is incorporated herein by reference in entirety, discloses an integrated module for measuring a flow rate of a fluid, whether gaseous or liquid, with a flow restrictor comprising a plurality of orifices adapted to a flow channel of the integrated module and a sensor mounted to measure a property of the fluid at said flow restrictor corresponding to the flow rate. The integrated module provided may be used in numerous flow systems, such as reactors, ventilators and respirators, and has the benefit of better laminarization of the flow as well as better calibration between the flow sensor and the flow restrictor for more accurate flow measurements.

U.S. Pat. No. 6,267,006, which is incorporated herein by reference in entirety, discloses an air induction assembly disposed in an intake passage through which air flows to an engine. The air induction assembly has a conduit member which defines an air flow path. A MAF sensor is located in the intermediate conduit portion and is in fluid communication with the air flow path. The MAF sensor is operative to generate an output signal corresponding to air flow rate within the intermediate conduit portion. A plurality of flow conditioning elements (FCEs) in the airflow path produces a uniform airflow with low turbulent fluctuations to the MAF sensor under all vehicle and engine speeds without excessively restricting the air flowing to the engine.

U.S. Pat. No. 6,199,434, which is incorporated herein by reference in entirety, discloses a device for metering the volume of gas flowing in a pipe, downstream from an expander-regulator, comprising in succession a flow straightener, a velocity-measuring flowmeter, and a silent flowrate limiter. The straightener comprises a support ring in which there are mounted a first perforated plate having holes distributed over its surface, together with a first porous plate and a spacer in the form of an annulus co-operating with the first perforated plate. The limiter comprises an upstream web defining a second perforated plate perforated by a defined number of calibrated holes, the total flow section thereof being much less than the total flow section of the first perforated plate, a second perforated plate, and a downstream web defining a third perforated plate having holes of total flow section that is much greater than the total flow section of the second perforated plate of the upstream web.

U.S. Patent Application Publication No. 2005/0087012 discloses a mass tube for a MAF sensor comprising a metal grid acting as a flow rectifier arranged perpendicular to the air flow. At least two fixing elements are arranged on the measuring tube, said elements extending inwards in a radial manner, whereon the metal grid is fixed by pre-tensioning.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A first embodiment relates to an air cleaner. The air cleaner includes a housing having an air inlet and an air outlet. The air cleaner further includes a filter media coupled to the housing and positioned between the air inlet and the air outlet, the filter media configured to filter an air flow that enters the housing through the air inlet and exits the housing through the air outlet. The air cleaner includes a rectifier coupled to the housing and positioned at a location downstream of the filter media, the rectifier including an outer ring that is orthogonally oriented with respect to the air flow.

Another embodiment relates to an air flow rectifier that rectifies air flow at a location downstream of filter media. The air flow rectifier includes concentric inner and outer rings that are spaced apart from each other so that an annular gap exists between the inner and outer rings. The inner ring defines an open interior and wherein the inner ring has a plurality of through-holes that are spaced apart from each other around the circumference of the inner ring.

A further embodiment relates to a method of assembling an air cleaner. The method includes providing an air filtration cartridge comprising a filter media that filters an air flow from an upstream inlet to a downstream outlet. The method further includes providing a mass airflow sensor downstream of the filter media for sensing a characteristic of the air flow. The method includes providing a rectifier between the filter media and the airflow sensor, the rectifier for rectifying the air flow downstream of the filter media. The method further includes configuring the rectifier so as to modify the characteristic of the air flow and produce a predetermined output from the mass airflow sensor.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, various embodiments disclosed herein relate to improving the accuracy of mass air flow (MAF) sensor digital output signals or voltage signals to an engine control module (ECM) of an internal combustion engine. In some arrangements, air filtration systems are disclosed as including a secondary filter element with tuned air flow rectifier to allow for low variation of a MAF sensor digital output signal or voltage signals to an ECM. In such arrangements, an air filtration cartridge is provided that incorporates a combination of geometrically-placed annular flow rings which rectify the flow field downstream of the filter media such that a specific MAF sensor output is achieved. The challenge is to control the MAF sensor output with a tunable rectifier design to enable the use of multiple media types without affecting MAF sensor output. In additional arrangements, air filtration systems are disclosed as having an airflow rectifier plate used to provide air to a MAF sensor that both rectifies the air flow to the MAF sensor and reduces the pressure loss across rectifier thereby providing more accurate MAF sensor digital output signals or voltage signals to an ECM. In such arrangements, the rectifier plate is placed downstream of the filter media and includes holes that reduce the pressure loss.

Figure 1:
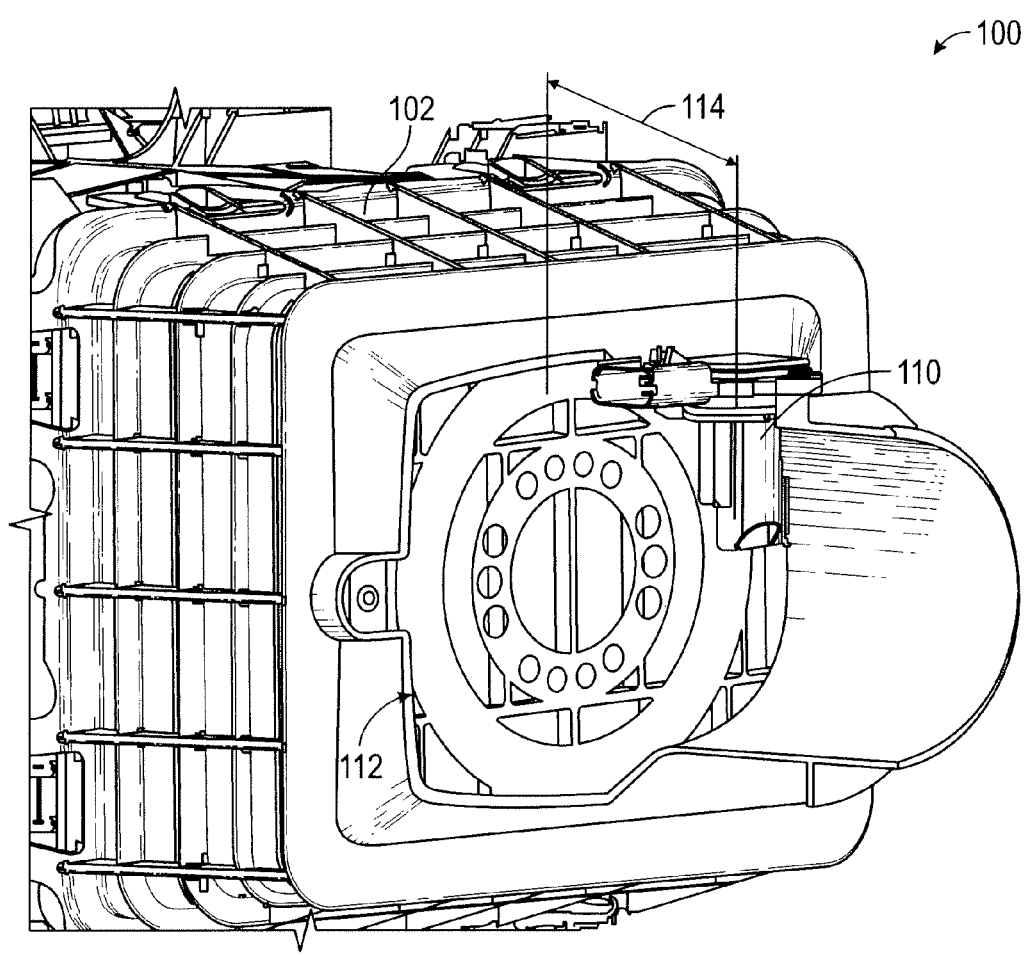
FIG. 1 shows a perspective partial cutout view of an air cleaner according to an exemplary embodiment.
Figure 2:
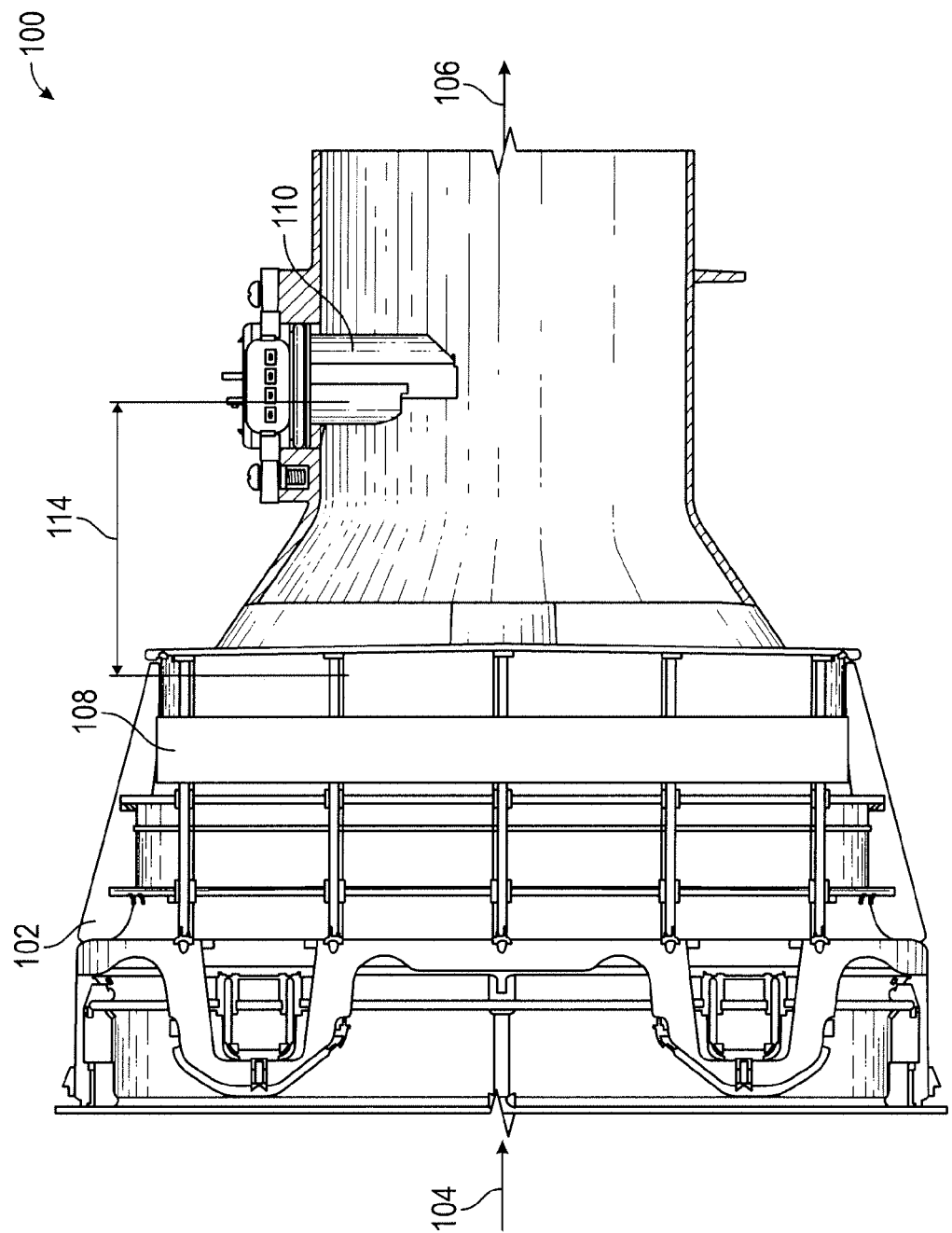
FIG. 2 shows a side partial cutout view of the air cleaner of FIG. 2.
Figure 3:
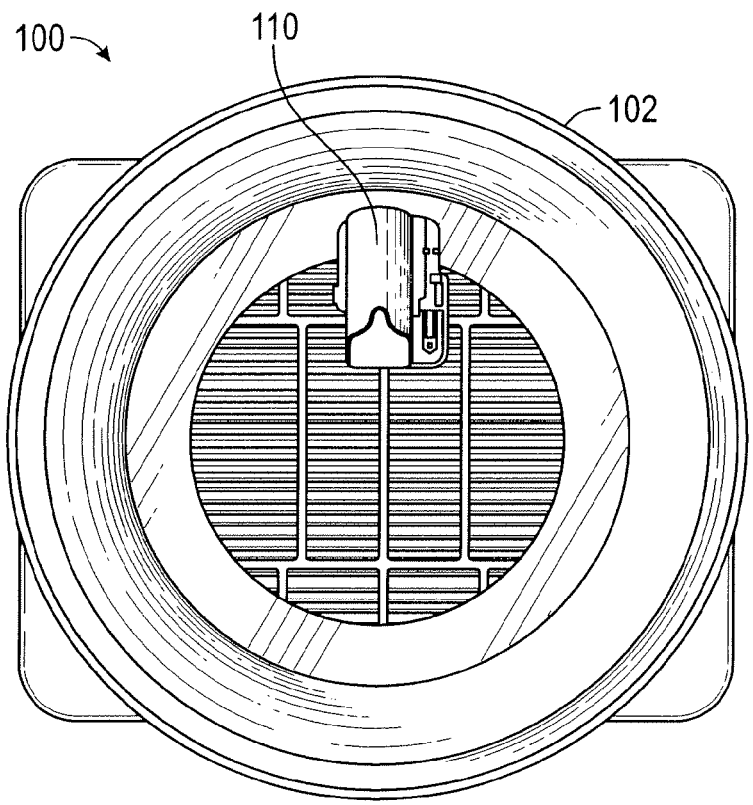
FIG. 3 shows a cross sectional view of the air cleaner of FIG. 1 having an off center mass air flow sensor.

Referring to FIGS. 1 and 2, different views of an air cleaner 100 are shown according to an exemplary embodiment. FIG. 1 shows a perspective partial cutout view of the air cleaner 100. FIG. 2 shows a side partial cutout view of the air cleaner 100. The air cleaner 100 includes a housing 102 having an air inlet 104 and an air outlet 106. The inlet 104 provides air to be filtered into the housing 102. The outlet 104 supplies filtered air to a receiving device, such as an internal combustion engine. The housing includes filter media 108 coupled to the housing 102 and positioned between the inlet 104 and the outlet 106. The filter media 108 may be a foam-based filter media or a pleated filter media. The air cleaner 100 includes a MAF sensor 110 positioned downstream of the filter media 108 (i.e., between the filter media 108 and the outlet 106). The MAF sensor 110 may be centrally mounted within the housing 102 or mounted in an off-center manner (e.g., as shown in FIG. 3). The MAF sensor 110 provides a digital output or a voltage signal to an ECM (not shown). The digital output or voltage signal correspond to an amount of air flow leaving the filter media 108 and exiting the housing 102 through the air outlet 106.

The housing 102 includes an air flow rectification device 112. The air flow rectification device 112 is coupled to the housing 102 positioned between the filter media 108 and the MAF sensor 110 (i.e., at a location downstream of the filter media 108 and upstream of the MAF sensor 110). The air flow rectification device 112 rectifies (e.g., straightens) the air flow exiting the filter media 108 prior to being analyzed by the MAF sensor 110. The air flow rectification device 112 is offset from the MAF sensor 110 by a distance 114, which creates a region of uniform and stable air flow. The air flow rectification device 112 is orthogonaly oriented with respect to the air flow through the housing 102. The air flow rectification device 112 acts as a sharp edged orifice to disrupt the air flow in a controlled manner, which provides a consistent stream of filtered air to the MAF sensor 110. The location and dimensions of the air flow rectification device 112 are selected (by experiment) to produce the desired MAFs performance characteristics (deviation and signal-noise stability). In some arrangements, the air flow rectification device 112 is rectangular in cross-section, and can be installed in two orientations—designated "As-Is" and "180" or "180-deg". This means that the air flow rectification device 112 can be rotated by 180 degrees about its air flow centerline, when viewed from the MAF sensor 110 air flow inlet window.

Figure 4:
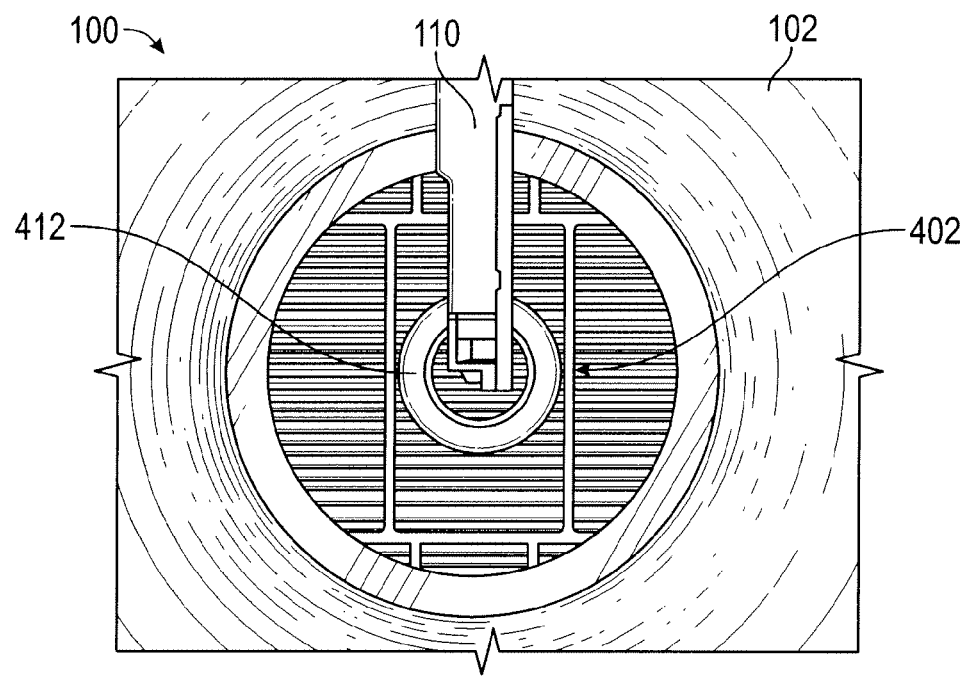
FIG. 4 shows a front view of an air flow rectification device according to an exemplary embodiment.

Referring to FIG. 4, a front view of an embodiment of an air flow rectification device 412 is shown is according to an exemplary embodiment. As shown in FIG. 4, in the simplest form of the air flow rectification device 112 is air flow rectification device 412, which comprises a single washer 402. The washer 402 (i.e., a ring) is centrally located within the housing 102 upstream of the MAF sensor 110. The washer 402 is orthogonally oriented with respect to the air flow through the housing. In such an arrangement, the device 412 does not permit adjustment of the device 412 to "dial in" specific outputs from the MAF sensor 110. In other words, the flow field created downstream of the washer may be stable and uniform as it is presented to the MAF sensor 110, but the output of the MAF sensor, when subjected to this flow field, is not controlled to achieve a specific digital output value or a specific voltage output to the ECM at a specific flow rate (e.g., as may be needed for calibration of the MAF sensor 110 after a filter media change). The uniform and stable flow of air may be large enough to provide the uniform and stable flow to an off-center MAF sensor 110 (e.g., as shown in FIG. 3). The use of a single washer as the device 412 advantageously achieves a stable, uniform flow field at the MAF sensor 110 with minimum pressure loss in the system. However, the flow field created by the single washer is not tunable.

Figure 5:
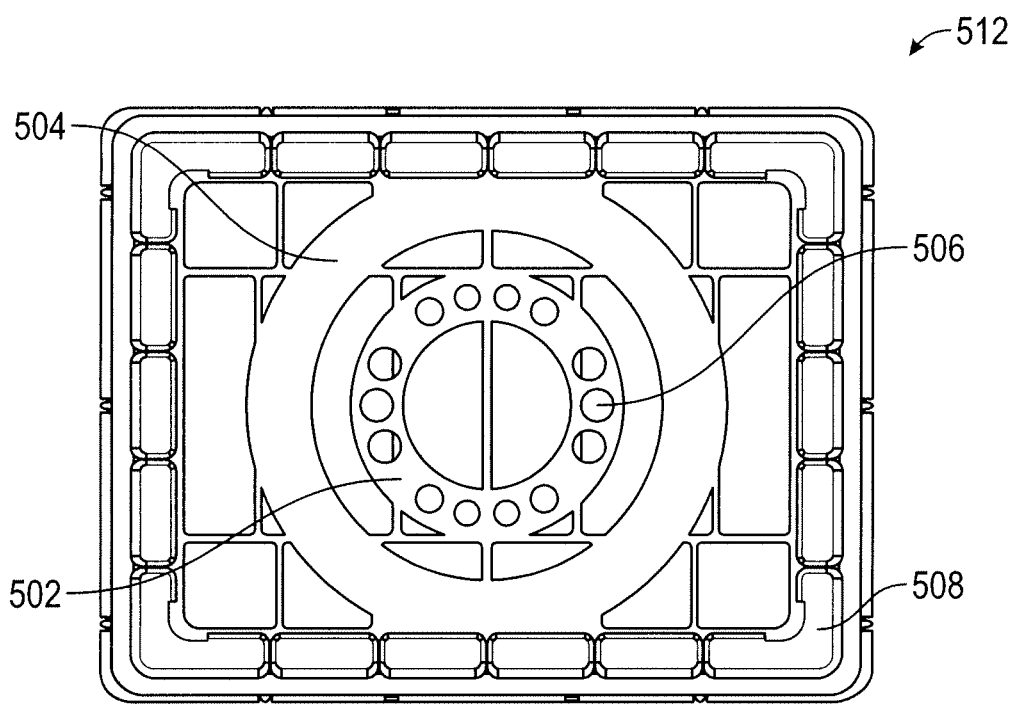
FIG. 5 shows a front view of an air flow rectification device according to another exemplary embodiment.
Figure 6:
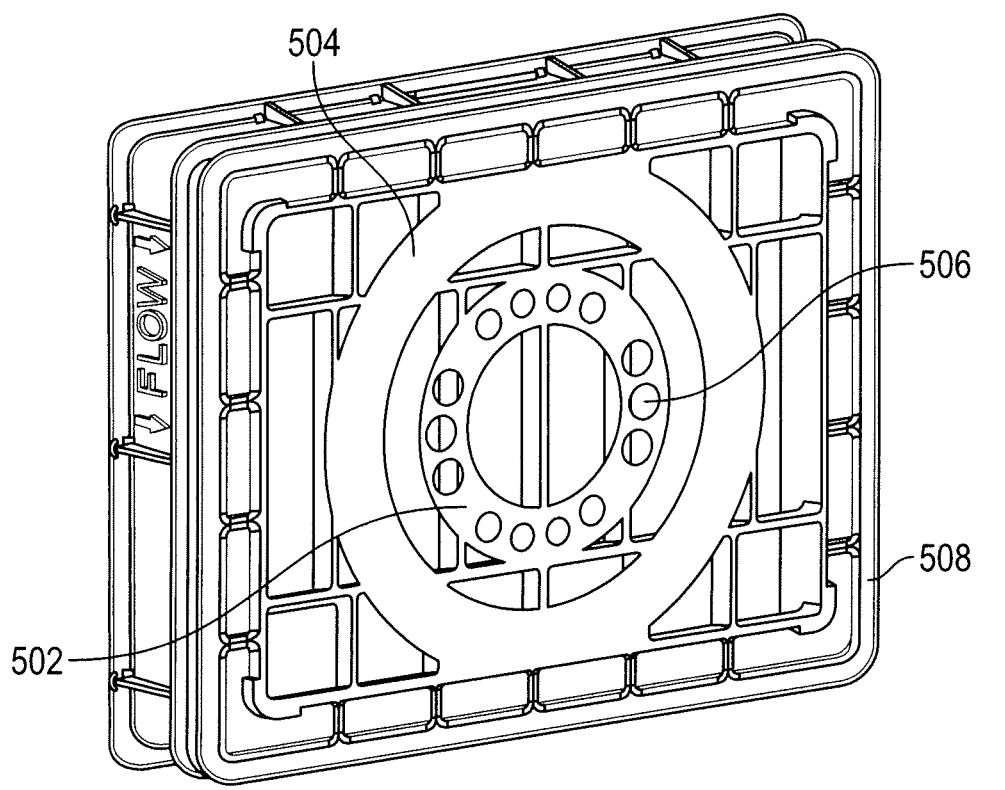
FIG. 6 shows a perspective view of the air flow rectification device of FIG. 5.

Referring to FIGS. 5 and 6, views of another embodiment of an air flow rectification device 112, device 512, are shown according to another exemplary embodiment. The device 512 as shown in FIGS. 5 and 6 has the same arrangement as shown in FIG. 1. In this arrangements, the device 512 includes an inner washer 502 and an outer washer 504. The inner washer 502 and the outer washer 504 are concentric and radially spaced annular flow rings. In some arrangements, the inner washer 502 includes a plurality of through-holes or openings 506. The openings 506 are spaced apart from each other and are disposed around the circumference of the inner washer 502. The device 512 as shown in FIGS. 5 and 6 is capable of providing a tunable air flow. The size of the diameter of the outer washer 504 affects the gross air flow velocity through the device 512. The inner washer 502 outer diameter relationship to the inner diameter of the outer washer 504 provides a more refined flow velocity. The openings 506 in the inner washer 502 provide the device 512 a fine tuning capability, which adjusts the air flow velocity to produce specific MAF sensor 110 output values across a desired flow range. The openings 506 additionally reduce the pressure loss in the air stream flowing past the device 512. Additionally, the off-center nature of the openings 506 additionally assists in providing a consistent air flow to an off-center MAF sensor 110 (e.g., as shown in FIG. 3). In some arrangements, the inner washer 502 can be rotated with respect to the outer washer 504 to tune the rectified air flow to the MAF sensor 110. The device 512 works by utilizing sharp edge orifices incorporating specific hole sizes of openings 506 and hole patterns to disrupt the flow field in a controlled manner to achieve uniform turbulent flow at the MAF sensor 110 inlet. The inner washer 502 and the outer washer 504 are coupled to and supported on a support frame 508, which is inserted into the housing. In some arrangements, the support frame 508 is coupled to the filter media.

Still referring to FIGS. 5 and 6, the air flow effects of the inner washer 502, the outer washer 504, and the openings 506 may be obtained by other physical shapes (e.g., non-circular elements and non-circular openings). For example, the openings 506 may be of a non-circular shape. The arrangement and shapes of the device 512 of FIGS. 5 and 6 were specifically chosen because the arrangement is easily manufactured with simple tools and in a very short period of time, which minimizes cost and manufacturing time for parts. The support frame 508 may be molded from plastic. In some arrangements, the inner washer 502 and the outer washer 504 are also molded from plastic. The inner washer 502, the outer washer 504, and the support frame 508 may be molded as a single piece. The features may be created in a separate and specific carrier and placed in the flow field upstream of the MAF sensor 110 and achieve the same results.

There are multiple advantages for utilizing the approach of device 512 to flow rectification. The incorporation of the inner washer 502 and the outer washer 504 into the frame 508 minimizes cost. The location and size of the frame 508 incorporating these features provides a flow area larger than the clean air duct at the MAF sensor 110 mounting location. The pressure loss is minimal since the flow area at the frame 508 is larger than the diameter of the housing 102 at the location of the MAF sensor 110. The positioning of the frame 508 within the housing allows air flow velocity "adjustments" made by the flow rectification features to be effective.

Still referring to FIGS. 5 and 6, the device 512 is adjustable such that the device 512 can account for changes in air flow due to the effects of changes of the filter media 108 on the MAF sensor 110 output. The MAF sensor 110 output in the air cleaner 100 is characterized by a "Master Characteristic", or a series of values which relate the MAF sensor 110 output to specific air flow rates. These values are stored in and used by the ECM to establish the air flow into the engine from the air cleaner 100. The output from the MAF sensor 110 may be used for emissions control. The ability to physically change the filter media 108 without changing the Master Characteristic allows the potential development of more efficient, less expensive filter media 108 without requiring the use of physical design features to preclude use of "better" or less expensive parts which could affect the emissions performance of the engine system.

Figure 12:
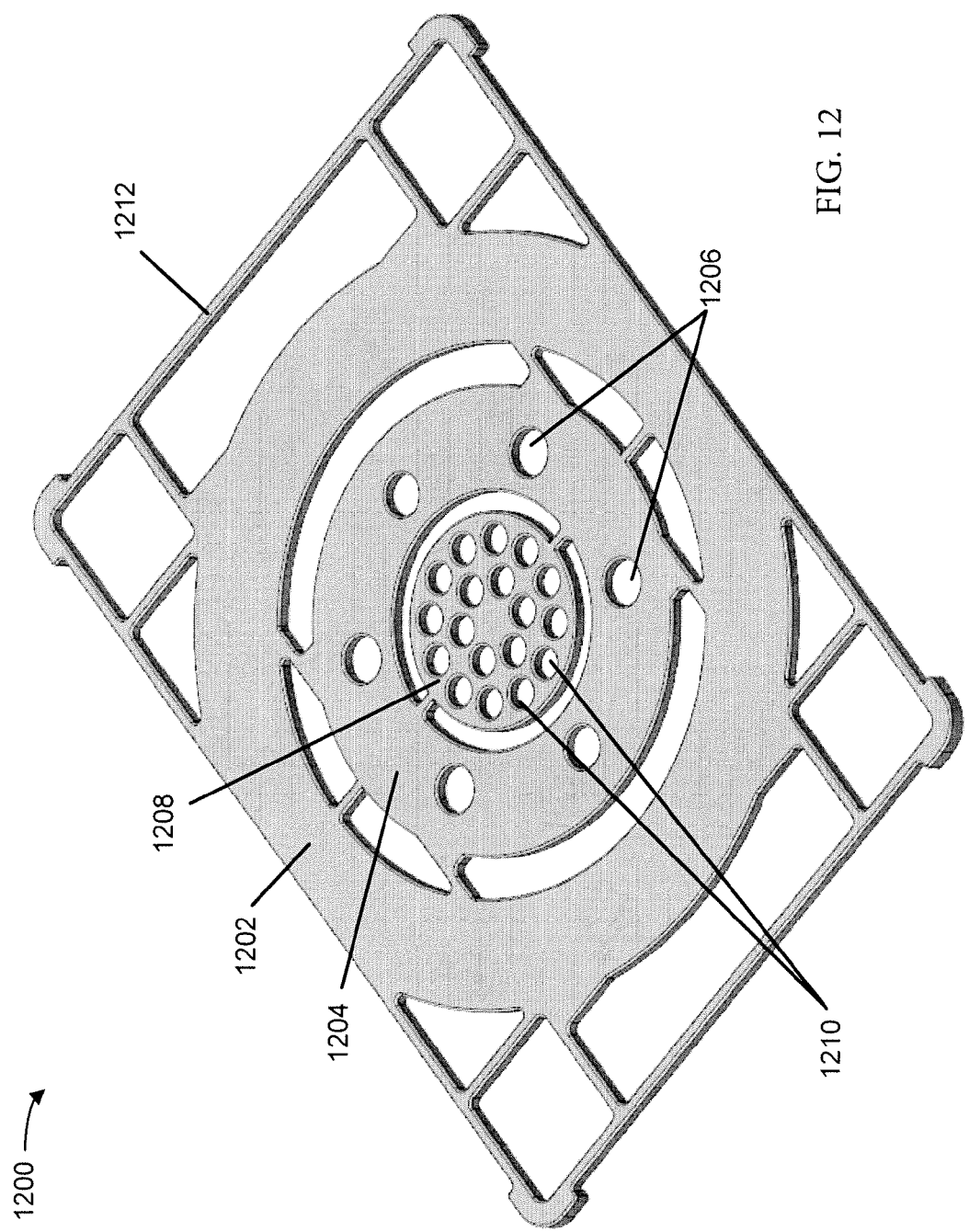
FIG. 12 shows a perspective view of an air flow rectification device according to another exemplary embodiment.

Referring to FIG. 12, a perspective view of an air flow rectification device 1200 is shown according to another exemplary embodiment. The air flow rectification device 1200 includes an outer washer 1202 and an inner washer 1204 arranged inside of and concentric with the outer washer 1202. The inner washer 1204 includes a plurality of first through-holes or first openings 1206. The first openings 1206 are similar to openings 506 of device 512. The first openings 1206 are spaced apart from each other and are disposed around the circumference of the inner washer 1204. The air flow rectification device 1200 also includes a disc 1208. The disc 1208 is concentrically arranged within the inner washer 1204. The disc 1208 includes a plurality of second through-holes or second openings 1210. The second openings 1210 are spaced apart from each other and are disposed across the surface of the disc 1208. The outer washer 1202, the inner washer 1204, and the disc 1208 are supported on a frame 1212. The air flow rectification device 1200 performs a similar function within an air duct as described above with respect to air flow rectification devices 112, 412, and 512.

The following two tables show experimental data. Table 1 demonstrates that the Master Characteristic is the average of ten foam secondaries flowed on a bench test in the 7×7 side inlet air induction system used as a development test fixture. Table 2 shows evidence showing the rectifier can be tuned.

TABLE 1

| | CFM Flow Rate | 115 | 145 | 175 | 215 |
|---|---|---|---|---|---|
| MAF Sensor Output (Hz) | Sec07_WA13-138-AsIs | 3236.94 | 3053.45 | 2915.45 | 2764.24 |
| MAF Sensor Output (Hz) | Sec07_WA13-138-180 | 3236.56 | 3053.51 | 2917.31 | 2765.15 |
| Frequency Difference | As Is minus 180 | 0.38 | −0.06 | −1.92 | −0.91 |
| MAF Sensor Output (Hz) | Average of As Is and 180 | 3236.75 | 3053.48 | 2916.41 | 2764.70 |
| Master Characteristic | Foam Mean Freq. | | | 3073.29 | 2931.04 |
| Pleated minus Foam | Avg. minus Mean | | | −19.81 | −14.63 |

TABLE 2

| | CFM Flow Rate | 115 | 145 | 175 | 215 |
|---|---|---|---|---|---|
| MAF Sensor Output (Hz) | Sec07_WA13-138-AsIs | 3275.54 | 3073.82 | 2926.48 | 2769.08 |
| MAF Sensor Output (Hz) | Sec07_WA13-138-180 | 3277.02 | 3083.84 | 2937.69 | 2783.81 |
| Frequency Difference | As Is minus 180 | −1.48 | −10.02 | −11.21 | −14.73 |
| MAF Sensor Output (Hz) | Average of As Is and 180 | 3276.28 | 3078.83 | 2932.09 | 2776.45 |
| Master Characteristic | Foam Mean Freq. | | | 3073.29 | 2931.04 |
| Pleated minus Foam | Avg. minus Mean | | | 5.54 | 1.05 |

Figure 7:
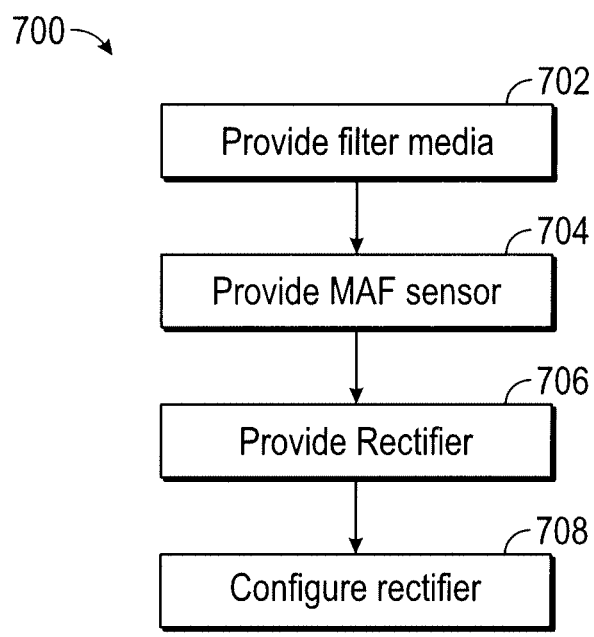
FIG. 7 shows a flow diagram of a method of assembling an air cleaner according to an exemplary embodiment.

Referring to FIG. 7, a flow diagram of a method 700 of assembling an air cleaner (e.g., air cleaner 100) is shown according to an exemplary embodiment. An air filtration cartridge having a filter media that filters an air flow from an upstream inlet to a downstream outlet is provided (702). A MAF sensor is provided downstream of the filter media for sensing a characteristic of the air flow (704). The predetermined output from the mass airflow sensor comprises a range of outputs. A rectifier is provided between the filter media and the MAF sensor (706). The rectifier rectifies the air flow downstream of the filter media. The rectifier is configured so as to modify the characteristic of the air flow and thereby produce a predetermined output from the MAF sensor. In some arrangements, the configuring the rectifier includes configuring the air flow rectifier to have concentric inner and outer rings that are orthogonally oriented with respect to the air flow. In such an arrangement, an outer diameter of the inner ring and an inner diameter of the outer ring are configured to achieve a certain airflow velocity downstream of the rectifier. The configuring may also include configuring a structural feature of the inner ring to achieve a certain airflow velocity downstream of the rectifier. The configuring may also include configuring a structural feature of the outer ring to achieve a certain airflow velocity downstream of the rectifier. In certain arrangements, the inner ring has a plurality of through-holes that are spaced apart from each other and disposed around the circumference of the inner ring; and further comprising configuring the plurality of through-holes to achieve a certain airflow velocity downstream of the rectifier. The inner ring may define an open interior, and comprising further configuring the inner ring to achieve a certain airflow velocity downstream of the rectifier.

Figure 8:
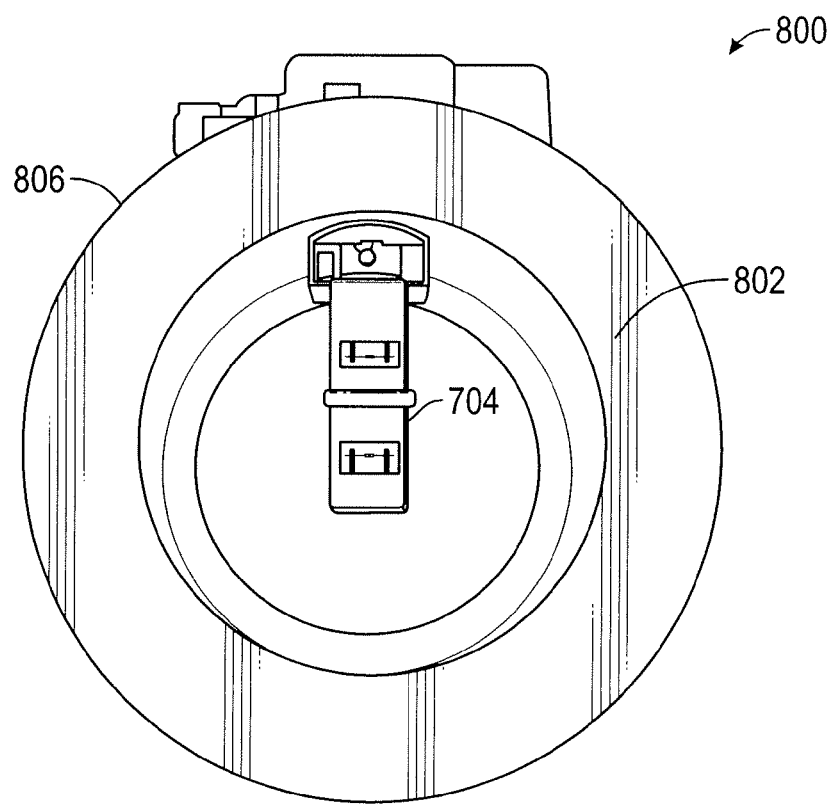
FIG. 8 shows a front view of an air flow system according to an exemplary embodiment.

Referring to FIG. 8, a front view of an air flow system 800 is shown according to an exemplary embodiment. The air flow system includes an air flow rectification device 802 and a MAF sensor 804. The device 802 is similar to air flow rectification device 112 in that the device 802 provides a uniform and stable flow of air to the MAF sensor 804. The air flow rectification device 802 includes a single washer positioned within an air duct 806. Although the air flow rectification device 802 provides a uniform and stable flow of air to the MAF sensor 804, the air flow rectification device 802 can cause a substantial pressure loss in the flow of air.

For example, in an arrangement where the air flow rectification device 802 has an orifice of 2.53 inches, the air flow rectification device 802 causes a pressure loss of approximately 2.4 inches of $H_2O$ at an air flow rate of approximately 350 CFM.

The following tables include testing data for the use of the air flow rectification device 802 in the arrangement as discussed above. Table 3, demonstrates the pressure loss experienced while the air flow rectification device 802 ("Rectifier Pressure Loss") compared to an air flow system without a flow rectifier ("Baseline Pressure Loss"). Table 2 demonstrates the standard deviation in hertz of the digital output of the MAF sensor 804 when used with air flow rectification device 802. As shown in Table 4, the standard deviation is less than 60 Hz for the single washer flow rectifier.

TABLE 3

| Flow Rate (CFM) | Baseline Pressure Loss (inches $H_2O$) | Rectifier Pressure Loss (inches $H_2O$) | Pressure Loss Associated with Rectifier use (inches $H_2O$) |
|---|---|---|---|
| 106 | 1.63 | 1.90 | 0.27 |
| 115 | 1.83 | — | — |
| 145 | 2.79 | — | — |
| 175 | 3.91 | — | — |
| 215 | 5.71 | — | — |
| 275 | 9.05 | 10.57 | 1.52 |
| 350 | 14.37 | 16.81 | 2.44 |

TABLE 4

| SecAngle | Sec03Rec05 (Hz) |
|---|---|
| 0 | 7328.22 |
| 45 | 7292.12 |
| 90 | 7293.77 |
| 135 | 7330.33 |
| 180 | 7314.58 |
| 215 | 7325.45 |
| 270 | 7344.10 |
| 315 | 7318.30 |
| 360(0) | 7314.02 |
| Avg. | 7317.88 |
| Min | 7292.12 |
| Max | 7344.10 |
| Dev | 51.98 |

TABLE 6

| SecAngle | Sec03Rec05 (Hz) |
|---|---|
| 0 | 7054.64 |
| 45 | 7016.58 |
| 90 | 7027.42 |
| 135 | 7058.32 |
| 180 | 7041.56 |
| 215 | 7045.68 |
| 270 | 7070.10 |
| 315 | 7073.21 |
| 360(0) | 7051.64 |
| Avg. | 7048.80 |
| Min | 7016.58 |
| Max | 7073.21 |
| Dev | 56.63 |

Figure 9:
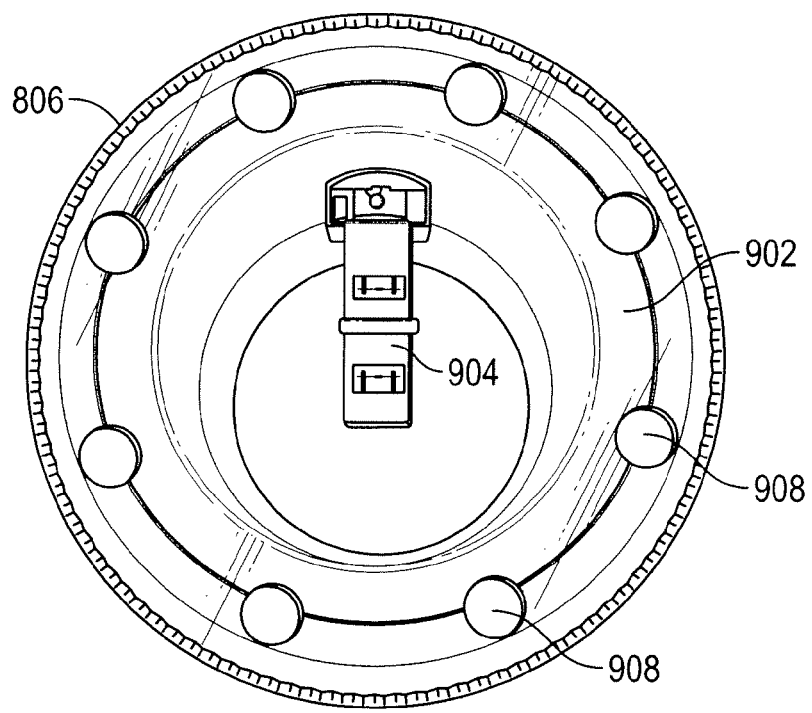
FIG. 9 shows a front view of an air flow system device according to another exemplary embodiment.

Referring to FIG. 9, a front view of an air flow system 900 is shown according to an exemplary embodiment. The air flow system 900 is similar to air flow system 800. The air flow system 900 includes an air flow rectification device 902 and a MAF sensor 904. The air flow rectification device 902 is similar to air flow rectification device 112 in that the air flow rectification device 902 provides a uniform and stable flow of air to the MAF sensor 904. Similar to the air flow rectification device 802 discussed previously, the air flow rectification device 902 includes a single washer positioned within an air duct 906. However, the air flow rectification device 902 includes a plurality of through-holes or opening 908. The openings are spaced apart from each other and disposed around the circumference of the air flow rectification device. The openings 908 may be evenly spaced around the air flow rectification device 902. The openings 908 of air flow rectification device 902 result in the air flow rectification device 902 causing a lower pressure loss than the air flow rectification device 802. For example, in an arrangement where the air flow rectification device 902 has an orifice of 2.53 inches and eight openings 908 each having a diameter of 0.375 inches, the air flow rectification device 902 causes a pressure loss of approximately 0.94 inches of $H_2O$ at an air flow rate of approximately 350 CFM, which is less than half of the pressure loss caused by air flow rectification device 802 at a similar air flow rate.

The following tables include testing data for the use of the air flow rectification device 802 in the arrangement as discussed above. Table 5, demonstrates the pressure loss experienced while the air flow rectification device 902 ("Rectifier Pressure Loss") compared to an air flow system without a flow rectifier ("Baseline Pressure Loss"). Table 6 demonstrates the standard deviation in hertz of the digital output of the MAF sensor 904 when used with the air flow rectification device 902. As shown in Table 6, the standard deviation is less than 60 Hz for the single washer flow rectifier.

TABLE 5

| Flow Rate (CFM) | Baseline Pressure Loss (inches $H_2O$) | Rectifier Pressure Loss (inches $H_2O$) | Pressure Loss Associated with Rectifier use (inches $H_2O$) |
|---|---|---|---|
| 106 | 1.63 | 1.77 | 0.14 |
| 115 | 1.83 | — | — |
| 145 | 2.79 | — | — |
| 175 | 3.91 | — | — |
| 215 | 5.71 | — | — |
| 275 | 9.05 | 9.65 | 0.6 |
| 350 | 14.37 | 15.31 | 0.94 |

Figure 10:
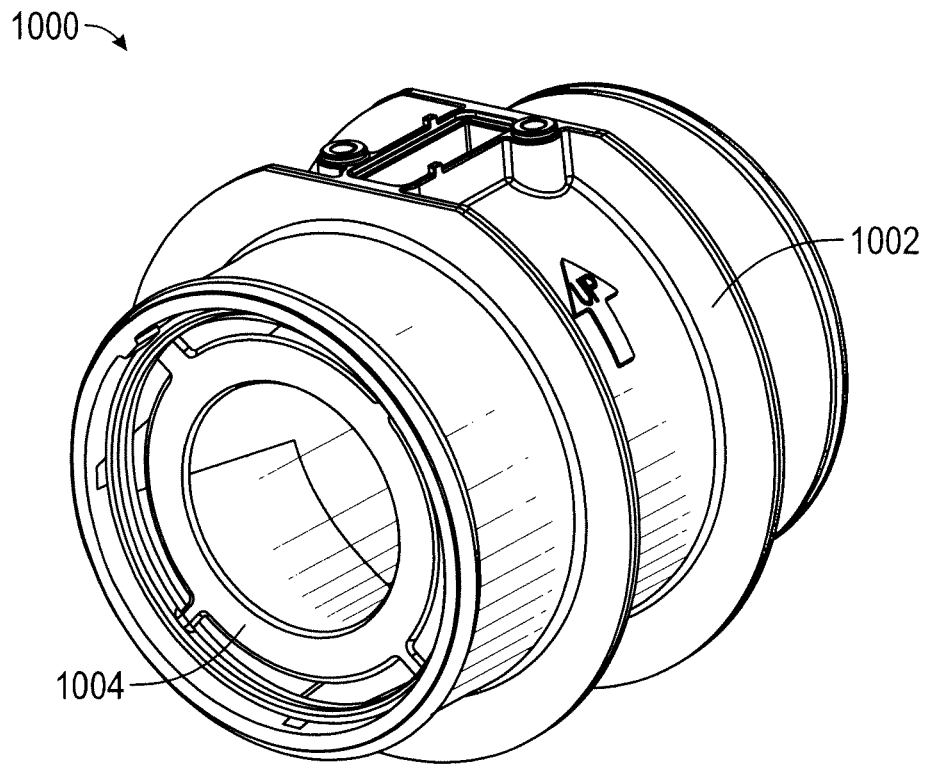
FIG. 10 shows a perspective view of an air flow system according to an exemplary embodiment.

Referring to FIG. 10, a perspective view of air flow system 1000 is shown according to an exemplary embodiment. The air flow system 1000 is similar to the air cleaner 100. The flow system 1000 includes an air duct 1002 and an air flow rectification device 1004. Although shown as a ring within the air duct 1002, the air flow rectification device 1004 may be of a similar configuration to air flow rectification devices 112, 412, 512, 802, or 902. The air flow rectification device 1004 is arranged in a manner that is generally orthogonal to the air flow through the air duct 1002. The air flow rectification device 1002 rectifies the air flow through the air duct 1002 in a similar manner as described above with respect to air flow rectification devices 112, 412, 512, 802, and 902. The air flow rectification device 1004 is generally a disc-shaped plate that is coupled to the air duct 1002. The air flow rectification device 1004 may be removably coupled to the air duct 1002 (e.g., via a snap-fit connection, with fasteners, etc.).

Figure 11:
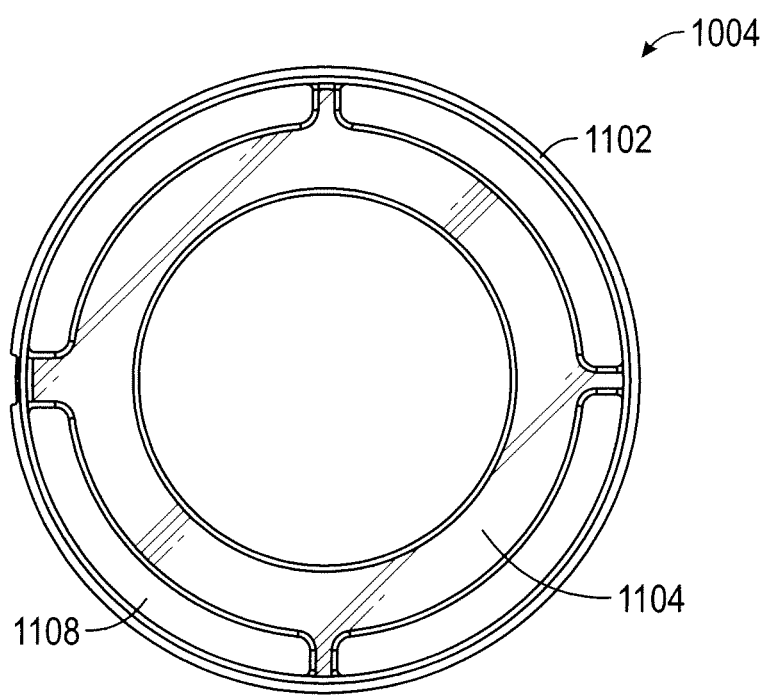
FIG. 11 shows a front view of the air flow rectification device of FIG. 10.

Referring to FIG. 11, a front view of the air flow rectification device 1004 is shown. The air flow rectification device 1004 is generally a disc-shaped plate. The air flow rectification device includes an outer support ring 1102. The outer support ring 1102 secures the air flow rectification device to the air duct 1002. The air flow rectification device 1004 includes an inner ring 1104 having a central opening 1108. The inner ring 1104 acts as a sharp edged orifice to disrupt the air flow in a controlled manner, which provides a consistent stream of filtered air through the air duct 1002 (e.g., to a MAF sensor). The inner ring 1104 is generally concentric with and spaced apart from the outer ring 1102 resulting in gaps 1108 between the inner ring 1104 and the outer ring 1108. The gaps 1108 reduce the pressure loss caused by the air flow rectification device 1004 by providing another passage way for air to flow past the air flow rectification device 1004.

In the present Detailed Description, certain terms have been used for brevity, clearness and understanding. No unnecessary limitations are to be inferred therefrom beyond the requirement of the prior art because such terms are used for descriptive purposes only and are intended to be broadly construed. The different air filtration cartridges, rectifiers and methods described herein may be used alone or in combination with other apparatuses and methods. Various equivalents, alternatives, and modifications are possible within the scope of the appended claims.

What is claimed is:
1. An air cleaner comprising:
a housing having an air inlet and an air outlet;
a filter media coupled to the housing and positioned between the air inlet and the air outlet, the filter media configured to filter an air flow that enters the housing through the air inlet and exits the housing through the air outlet; and a rectifier coupled to the housing and positioned at a location downstream of the filter media, the rectifier including an inner ring and an outer ring that are orthogonally oriented with respect to the air flow, the inner ring rotatable with respect to the outer ring such that the air flow is tunable.

2. The air cleaner according to claim 1, wherein the inner ring being concentric with the outer ring.

3. The air cleaner according to claim 2, wherein the inner ring and the outer ring of the rectifier are radially spaced apart so that an annular gap exists between the inner and outer rings.

4. The air cleaner according to claim 3, wherein the inner ring defines an open interior.

5. The air cleaner according to claim 2, wherein the inner ring has a plurality of through-holes that are spaced apart from each other and disposed around the circumference of the inner ring.

6. The air cleaner according to claim 5, wherein the plurality of through-holes are of a non-circular shape.

7. The air cleaner according to claim 2, wherein the inner ring and the outer ring are coupled to a support frame, wherein the support frame is coupled to the housing.

8. The air cleaner according to claim 1, further comprising a mass air flow sensor located downstream of the air flow rectifier.

9. The air cleaner according to claim 8, wherein the mass air flow sensor is mounted in an off-center manner within the housing.

10. The air cleaner according to claim 1, wherein the outer ring includes a plurality of through-holes that are spaced apart from each other and disposed around the circumference of the outer ring.

11. An air flow rectifier that rectifies air flow at a location downstream of filter media, the air flow rectifier comprising:

concentric inner and outer rings that are spaced apart from each other so that an annular gap exists between the inner and outer rings, wherein the inner ring defines an open interior, and wherein the inner ring has a plurality of through-holes that are spaced apart from each other and disposed around the circumference of the inner ring, the inner ring being rotatable with respect to the outer ring such that an air flow passing through the airflow rectifier is tunable.

12. The air flow rectifier according to claim 11, wherein the plurality of through-holes are of a non-circular shape.

13. The air flow rectifier according to claim 11, wherein the inner ring and the outer ring are coupled to a support frame.

14. A method of assembling an air cleaner, the method comprising:

providing an air filtration cartridge having a filter media that filters an air flow from an upstream inlet to a downstream outlet;

providing a mass airflow sensor downstream of the filter media for sensing a characteristic of the air flow;

providing a rectifier between the filter media and the airflow sensor, the rectifier for rectifying the air flow downstream of the filter media, the rectifier including concentric inner and outer rings, wherein the inner ring is rotatable with respect to the outer ring; and configuring the rectifier so as to modify the characteristic of the air flow and thereby produce a predetermined output from the mass airflow sensor.

15. The method according to claim 14, wherein the predetermined output from the mass airflow sensor comprises a range of outputs.

16. The method according to claim 14, wherein the inner and outer rings are orthogonally oriented with respect to the air flow.

17. The method according to claim 16, further comprising configuring an outer diameter of the inner ring and an inner diameter of the outer ring to achieve a certain airflow velocity downstream of the rectifier.

18. The method according to claim 16, further comprising configuring a structural feature of the inner ring to achieve a certain airflow velocity downstream of the rectifier.

19. The method according to claim 16, further comprising configuring a structural feature of the outer ring to achieve a certain airflow velocity downstream of the rectifier.

20. The method according to claim 16, wherein the inner ring has a plurality of through-holes that are spaced apart from each other and disposed around the circumference of the inner ring; and further comprising configuring the plurality of through-holes to achieve a certain airflow velocity downstream of the rectifier.

21. The method according to claim 16, wherein the inner ring defines an open interior, and comprising further configuring the inner ring to achieve a certain airflow velocity downstream of the rectifier.

* * * * *